UNITED STATES PATENT OFFICE.

ALBERT DOMEIER AND OTTO CHRISTIAN HAGEMANN, OF LONDON, ENGLAND, ASSIGNORS, BY MESNE ASSIGNMENTS, TO JAMES S. KIRK & CO., OF CHICAGO, ILLINOIS.

PROCESS OF RECOVERING GLYCERINE AND SALT FROM SPENT SOAP-LYE.

SPECIFICATION forming part of Letters Patent No. 475,757, dated May 31, 1892.

Application filed March 1, 1889. Serial No. 301,676. (No specimens.)

*To all whom it may concern:*

Be it known that we, ALBERT DOMEIER, merchant, and OTTO CHRISTIAN HAGEMANN, mechanical engineer, both of London, England, have invented a new and useful Process of Recovering Glycerine and Salt from Spent Soap-Lye, of which the following is a specification.

In carrying out our invention we proceed as follows: We place the spent soap-lye in a suitable tank and add thereto caustic lime or other earthy or metallic oxide or hydrate capable of combining with the fatty, soapy, and other matters which are held in suspension or solution in the spent lye. We effect the intimate admixture of the lime or its equivalent with the lye under treatment by any suitable means of agitation, but preferably by forcing air through it. The action of the lime or its equivalent is twofold—viz., chemical and mechanical. Chemically it forms insoluble lime-soaps with the fatty and soapy matters in solution and mechanically it "weights" or increases the specific gravity of the said insoluble lime-soaps and other insoluble impurities in the lye and causes them to precipitate and leave the supernatant lye clear and bright, or nearly so. The proportion of lime varies with different qualities of spent lye; but we add sufficient to clarify the lye as much as posible. We next draw off the clear lye, filtering it, if necessary, into another tank or other suitable vessel. From time to time we filter the aforementioned precipitate of lime or its equivalent and the impurities and add the filtered lye to that which has been previously drawn off filtered. We now by preference concentrate the drawn-off or filtered lye by applying heat to it and evaporating to about one-third to one-half of the water contained therein, or until said lye becomes saturated with the salt therein contained. In order to purify the lye from any further fatty matters, we next add hydrochloric or other suitable acid until no further precipitate is produced, removing the precipitate by filtration. We next add to the lye carbonated or caustic alkali to neutralize any free acid therein and cause the precipitation of any remaining albuminous matters. We draw off or filter the lye from this precipitate and finally concentrate it by boiling to about 302° Fahrenheit, thus producing crude glycerine. During the boiling the salt in the lye crystalizes and we remove it as formed. This salt we wash or otherwise purify for use again in the manufacture of soap.

We do not confine ourselves to any special apparatus for the filtering operation, but have found filter-presses constructed of material suitable to resist the acids and alkalies the most convenient.

We claim—

1. In the process of recovering glycerine and salt from spent soap-lye, the herein-described improvement, which consists, first, in adding lime or its equivalent earthy or metallic oxide or hydrate to the lye to precipitate all the impurities in suspension and partly those in solution, then filtering and decanting from the precipitate, then adding acid to precipitate the remainder of the fatty impurities in solution and filtering the liquor therefrom, then adding alkali to neutralize the acid and precipitate albuminous matters, and finally concentrating the clear liquor, as set forth.

2. In the process of recovering glycerine and salt from spent soap-lye, the herein-described improvement, which consists, first, in adding lime or its equivalent to the lye and filtering or decanting the liquor therefrom, then applying heat and evaporating the lye until it becomes saturated with salt, then adding acid and filtering, then adding alkali and again filtering or decanting, and finally concentrating to about 302° Fahrenheit and removing the salt, as set forth.

3. The herein-described process of recovering glycerine and salt from spent soap-lye, which consists, first, in adding lime or equivalent earthy or metallic oxide or hydrate to the lye and decanting and filtering from the precipitate thus produced, then adding acid to the filtered or decanted liquor, with or without previous concentration of such liquor, then filtering the liquor from any precipitate formed by the acid, then adding alkali to neutralize any excess of acid and precipitate any albuminous matters, and finally concentrating the liquor and removing salt therefrom as it crystallizes.

ALBERT DOMEIER.
OTTO CHRISTIAN HAGEMANN.

Witnesses:
M. B. WALLER,
    *U. S. Vice-Consul-General, London.*
A. E. LEOPOLD,
    *U. S. Consulate-Genl., London.*